United States Patent [19]

Kikuchi

[11] Patent Number: 5,694,992
[45] Date of Patent: Dec. 9, 1997

[54] COMBINATION ROUTER

[75] Inventor: Naoki Kikuchi, Chandler, Ariz.

[73] Assignee: Ryobi North America, Easley, S.C.

[21] Appl. No.: 773,390

[22] Filed: Dec. 26, 1996

[51] Int. Cl.⁶ ........................... B27C 5/00; B27M 1/00
[52] U.S. Cl. ........................ 144/136.95; 144/154.5; 144/371
[58] Field of Search ........................ 409/137, 180, 409/181, 182; 144/134.1, 135.2, 136.1, 136.95, 154.5, 371

[56] References Cited

U.S. PATENT DOCUMENTS

| | | | |
|---|---|---|---|
| 4,084,629 | 4/1978 | Kreusler | 144/154.5 |
| 4,640,324 | 2/1987 | Lounds | 144/154.5 |
| 4,741,370 | 5/1988 | Heaton | 144/135.2 |
| 4,858,663 | 8/1989 | Boston et al. | 144/136.95 |
| 4,909,680 | 3/1990 | Wolff | 144/136.95 |
| 4,971,122 | 11/1990 | Sato et al. | 144/136.95 |
| 4,977,938 | 12/1990 | Greeson | 144/154.5 |
| 5,005,617 | 4/1991 | Michaels | 144/154.5 |
| 5,013,195 | 5/1991 | Strazar | 409/180 |
| 5,013,196 | 5/1991 | Friegang | 409/182 |
| 5,028,179 | 7/1991 | Grasset | 409/180 |
| 5,117,879 | 6/1992 | Payne | 144/154.5 |
| 5,139,065 | 8/1992 | Stark | 144/371 |
| 5,160,114 | 11/1992 | Livingston | 144/136.95 |
| 5,273,091 | 12/1993 | Shibata | 144/136.95 |
| 5,285,831 | 2/1994 | Woolgar | 144/154.5 |
| 5,289,861 | 3/1994 | Hedrick | 144/135.2 |
| 5,299,609 | 4/1994 | Wedler | 144/136.95 |

*Primary Examiner*—W. Donald Bray
*Attorney, Agent, or Firm*—Brooks & Kushman P.C.

[57] ABSTRACT

A router for engaging a workpiece to be cut has a housing and a motor operable to rotate a drive shaft. A first fence is adjustably secured to the housing, and has a first planar surface oriented substantially parallel to the drive shaft axis. The first fence is adjustable to move the first planar surface toward and away from the drive shaft axis. A second fence is slidably attached to the first fence. The second fence has a second planar surface oriented substantially perpendicular to the drive shaft axis, and has an opening for receiving the bit therethrough. The second fence is slidable to move the second planar surface toward and away from the drive shaft to allow the bit to be plunged through the opening to cut the workpiece. The first and second planer surfaces are sufficiently sized so that either the first or second planer surface can be used as a base for the router with the router center of gravity located directly above the planer surface that is used as the router base.

14 Claims, 4 Drawing Sheets

5,694,992

COMBINATION ROUTER

TECHNICAL FIELD

The present invention relates to routers having adjustable fences.

BACKGROUND ART

Routers are used to remove material from surfaces using a high speed rotary cutting bit. Routers typically have a base, and a motor disposed in a housing. The motor drives a rotatable shaft which extends outward beyond the lower end of the housing. A collet is located on the end of the shaft for receiving and supporting a router bit for cutting the workpiece. The router bit extends through a central opening in the base to the cut the workpiece. Conventional routers operate at a no load shaft speed of about 23,000 to 25,000 rpm. When using the router at workpiece corners and other areas where greater care is required to achieve a desired detailed routing, a user must be careful not to move the router too slowly along the workpiece. By moving the router too slowly at a high drive shaft speed, the router will burn the workpiece.

Some existing routers use a cast base typically formed of aluminum, and have an adjustable edge guide secured to one side of the base. When cutting a workpiece, a user slides the bottom of the router base across the workpiece with the edge guide sliding along a longitudinal edge of the workpiece. These edge guide assemblies allow a user to selectively space the edge guide from the router bit. This facilitates the forming of parallel grooves aligned with and spaced from the edge of the workpiece.

A primary disadvantage associated with existing routers is the fact that the routers aren't versatile enough to be used in a wide variety of cutting operations.

SUMMARY OF THE INVENTION

It is, therefore, an object of the present invention to provide a combination router having an adjustable fence assembly that can be used in a wide variety of cutting operations.

In carrying out the above objects and other objects and features of the present invention, a router is provided. The router has a motor disposed in a housing, and the motor operatively rotates a drive shaft about a drive shaft axis. A collet is affixed to the drive shaft for receiving and supporting a bit for cutting a workpiece. A first fence is adjustably secured to the housing. The first fence has a first planar surface oriented substantially parallel to the drive shaft axis. The first fence is adjustable to move the first planar surface toward and away from the drive shaft axis to selectively space the bit from the first planar surface.

A second fence is slidably attached to the first fence. The second fence has a second planar surface oriented substantially perpendicular to the drive shaft axis. The second planer surface has an opening for receiving the bit therethrough. The second fence is slidable to move the second planar surface toward and away from the drive shaft to allow the bit to be plunged through the opening to cut the workpiece.

The first and second planer surfaces are sufficiently sized so that either the first or second planer surface can be used as a base for the router with the router center of gravity located directly above the planer surface that is used as the router base.

The advantages accruing to the present invention are numerous. For example, the router of the present invention provides a combination router that can perform a variety of different vertical or horizontal cutting operations by utilizing a two fence construction.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
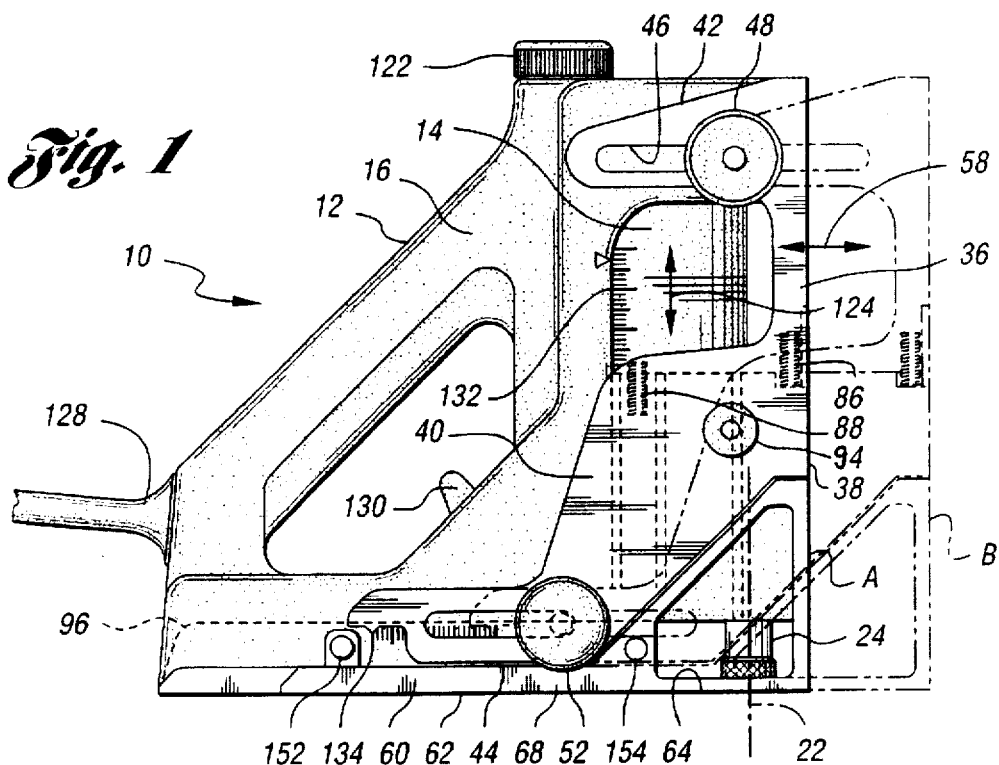
FIG. 1 is a side view of a router of the present invention showing motion of the first fence, indicated in phantom.
Figure 2:
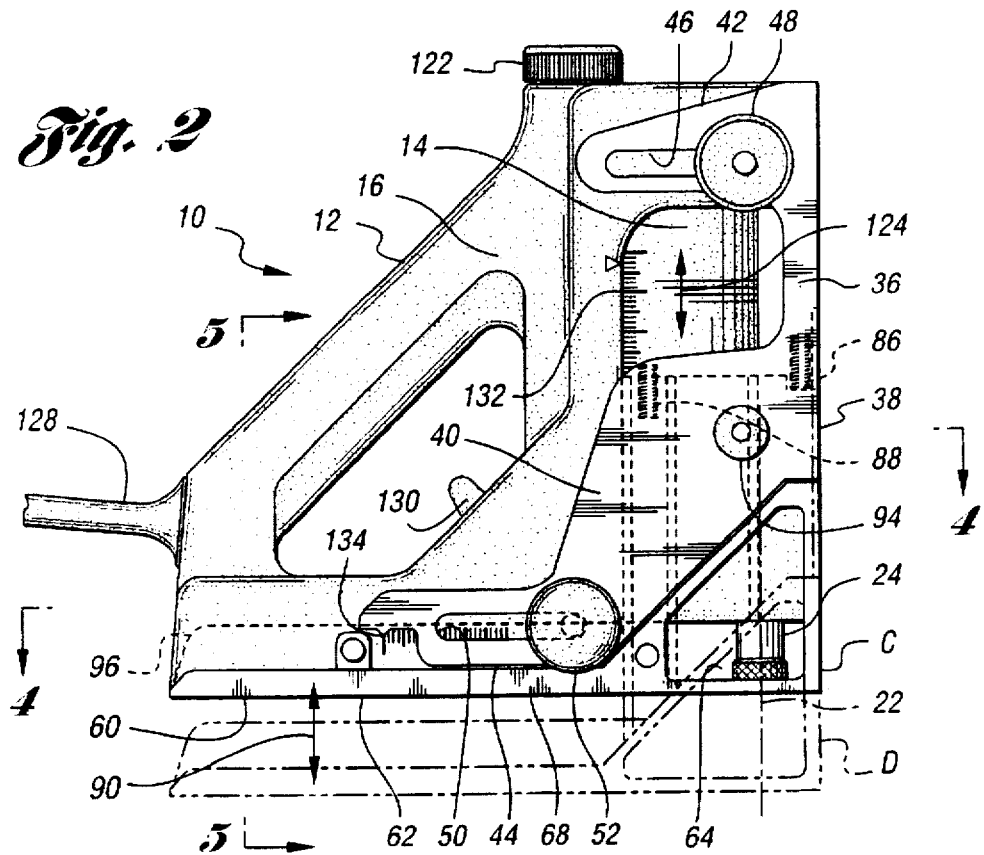
FIG. 2 is a side view of the router of FIG. 1 showing motion of the second fence, indicated in phantom.
Figure 3:
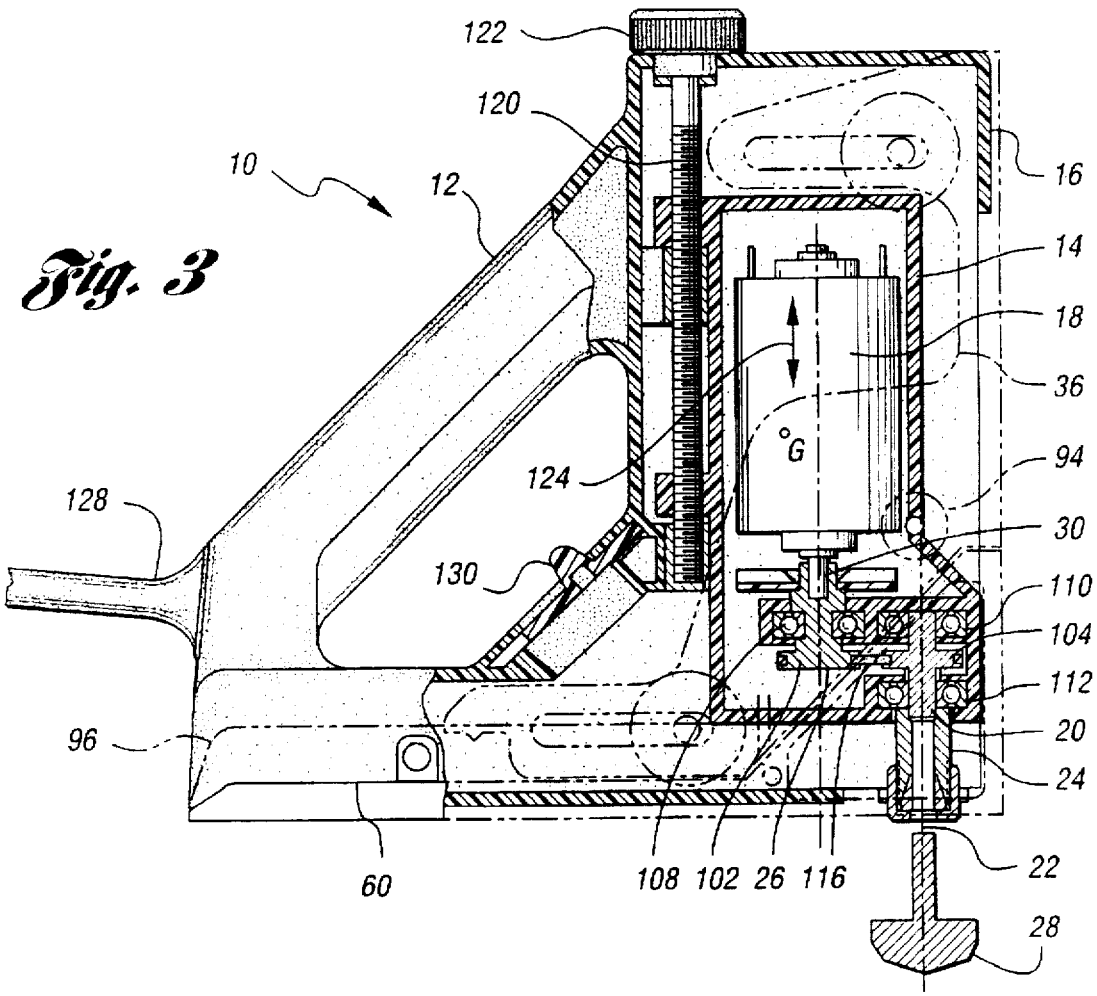
FIG. 3 is a side view, partially in section, of the router of FIG. 1.

Referring to FIGS. 1–3, a router made in accordance with the present invention is generally indicated at 10. The router 10 has a housing 12 which includes inner housing 14 and outer housing 16. The inner housing 14 is adjustably secured within the outer housing 16. A motor 18 is disposed in the inner housing 14. The motor 18 is operable to rotate a drive shaft 20 about a drive shaft axis 22. A collet 24 is affixed to the drive shaft 20. The collet 24 is capable of receiving and supporting a bit 28 for cutting the workpiece. The drive shaft 20 is driven by a drive mechanism 26 which connects the motor output shaft 30 to drive shaft 20. Drive mechanism 26 can be formed by a pair of gears (not shown) or by a pair of pulleys and interlocking drive belt.

A first fence 36 is adjustably secured to the outer housing 16. The first fence 36 has a first planar surface 38 and a pair of sides 40. Each side 40 has upper and lower portions 42 and 44, respectively. Upper portion 42 has a slot 46 through which is received a locking mechanism such as a threaded rod and knob arrangement. Knob 48 screws on to secure upper portion 42 of first fence 36. Lower portion 44 of side 40 has a slot 50. Knob 52 screws on to secure lower portion 44 of first fence 36.

By tightening knobs 48 and 52, the first fence 36 is secured and locked into position. Loosening knobs 48 and 52 allows adjustment of the first fence 36 as indicated by arrow 58 (FIG. 1). First fence 36 can be adjusted to move the first planar surface 38 toward and away from drive shaft axis 22 between a fully retracted position indicated at A (FIG. 1) and a fully extended position indicated at B (FIG. 1). Throughout the range of adjustments, the first planar surface 38 is oriented substantially parallel to the drive shaft axis 22. This wide range of adjustments allows the first planar surface 38 to be selectively spaced from the bit 28.

With reference to FIGS. 2–5, a second fence 60 is slidably attached to the first fence 36. The second fence 60 has a second planar surface 62 oriented substantially perpendicular to the drive shaft axis 22. The second planar surface 62 has an opening 64 for receiving the bit 28 therethrough.

Figure 4:
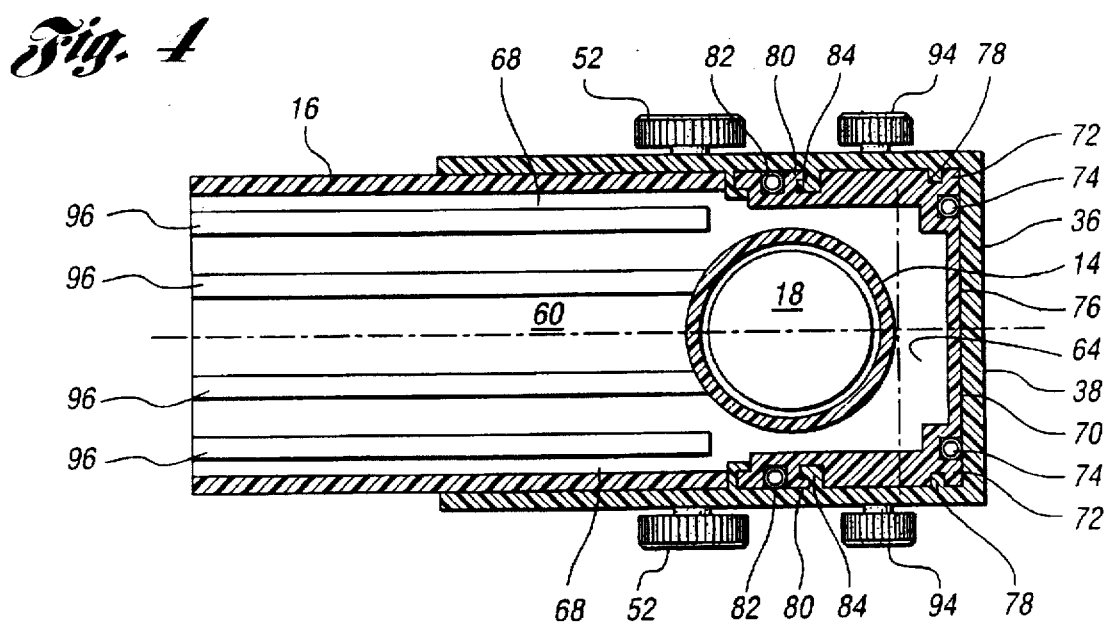
FIG. 4 is a cross-sectional view taken along line 4—4 of FIG. 2.

As best shown in FIG. 4, the second fence 60 has a pair of sides 68. Each side 68 includes a slide member 70. Each slide member 70 has a front slide 72 with a front spring pocket 74. The front slides 72 are connected by a front wall 76. Each side 40 of the first fence 36 includes a guide 78 that cooperates with front slide 72. Further, each slide member 70 has a rear slide 80 with a rear spring pocket 82. Sides 40 of first fence 36 include a pair of slide tracks 84 that cooperate with the rear slides 80.

With continuing reference to FIGS. 2–5, front springs 86 and rear springs 88 are received in front and rear spring pockets 74 and 82, respectively. The springs bias the second fence 60 away from the first fence 36. The second fence 60 is slidable to move second planar surface 62 toward and away from the drive shaft 20, as indicated by arrow 90 (FIG. 2). The second fence 60 is slidable between a fully retracted position indicated at C (FIG. 2) and a fully extended position indicated at D (FIG. 2). This allows the bit 28 to be plunged through the opening 64 to cut the workpiece. The second fence can be locked in a particular position, such as the fully retracted position C, by tightening plunge lock knob 94.

Figure 5:
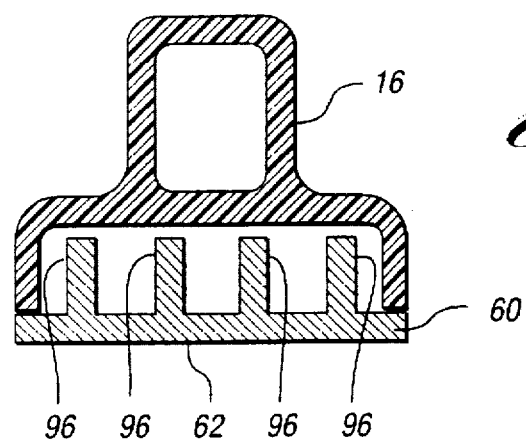
FIG. 5 is a cross-sectional view taken along line 5—5 of FIG. 2.

As best shown in FIGS. 4 and 5, a plurality of longitudinal ribs 96 are provided to strengthen the second fence 60.

It should be appreciated that there are a variety of ways to adjustably secure first fence 36 to outer housing 16. Further, there are many arrangements for second fence 60 to slidingly cooperate with first fence 36.

Referring now to FIG. 3, drive mechanism 26 includes first and second pulleys 102 and 104, respectively. The first pulley 102 is supported within the inner housing 14 by a bearing 108. The second pulley 104 is supported by a pair of bearings 110 and 112. The pulleys 102 and 104 are connected by a drive belt 116. The motor output shaft 30 drives the first pulley 102, which in turn drives the second pulley 104. Drive shaft 20 is driven by the second pulley 104 to rotate bit 28.

A plunge depth adjustment mechanism such as threaded rod 120 cooperates with the inner housing 14. Turning knob 122 moves the inner housing 14 relative to the outer housing 16 along arrow 124. This allows selective positioning of the drive shaft 20 relative to the outer housing 16 along the drive shaft axis 22, providing a plurality of positions for the bit 28 relative to the outer housing 16. This provides a plurality of plunge depths for the bit 28.

It is to be appreciated that there are other configurations possible for the plunge depth adjustment mechanism. For example, the router could have a unitary housing with a fixed motor. The bit drive shaft position could be adjustable while maintaining communication with the motor output shaft to provide a plurality of plunge depths for the bit.

The motor 18 is powered from electrical cord 128. A motor speed selector mechanism such as three position switch 130 is connected in circuit with the motor 18. Switch 130 allows motor 18 to be selectively operated at a low speed or a high speed, the third position of switch 130 being the off position. Alternatively, switch 130 allows the user to infinitely vary the speed of the router by moving the switch knob from the "off" position to the "maximum speed" position. By enabling the user to infinitely vary the speed, the user can select the optimum speed for best control for a given workpiece material, cutter-type and diameter, and the desired material removal rate.

In a preferred embodiment, the motor 18 is a 120 volt DC motor. This motor and associated drive mechanism ratio produces a no load drive shaft speed of about 17,000 rpm. This is slower than a traditional direct drive router. The slower drive shaft speed allows more time to for a user to work without burning the wood. This is particularly useful when routing around workpiece corners.

It is to be appreciated that the collet 24 is offset from the motor output shaft 30 toward the first fence 36. This allows a greater contact area of the second planar surface 62 with a workpiece when routing around a corner of the workpiece. By employing drive shaft speeds of less than 20,000 rpm for rotating the bit, the router of the present invention achieves a detail router which allows a user to spend more time to achieve greater detail on the workpiece without burning the wood. If desired, the router 10 can be operated at the low drive shaft speed of approximately 13,000 rpm by appropriately selecting a drive ratio or varying the motor speed.

With reference to FIGS. 1 and 2, a first set of indicia 132 are located on inner housing 14 and are indicative of inner housing position relative to the outer housing 16. Further, a second set of indicia 134 are located on the outer housing 16 and are indicative of first fence position relative to the outer housing 16.

Figure 6:
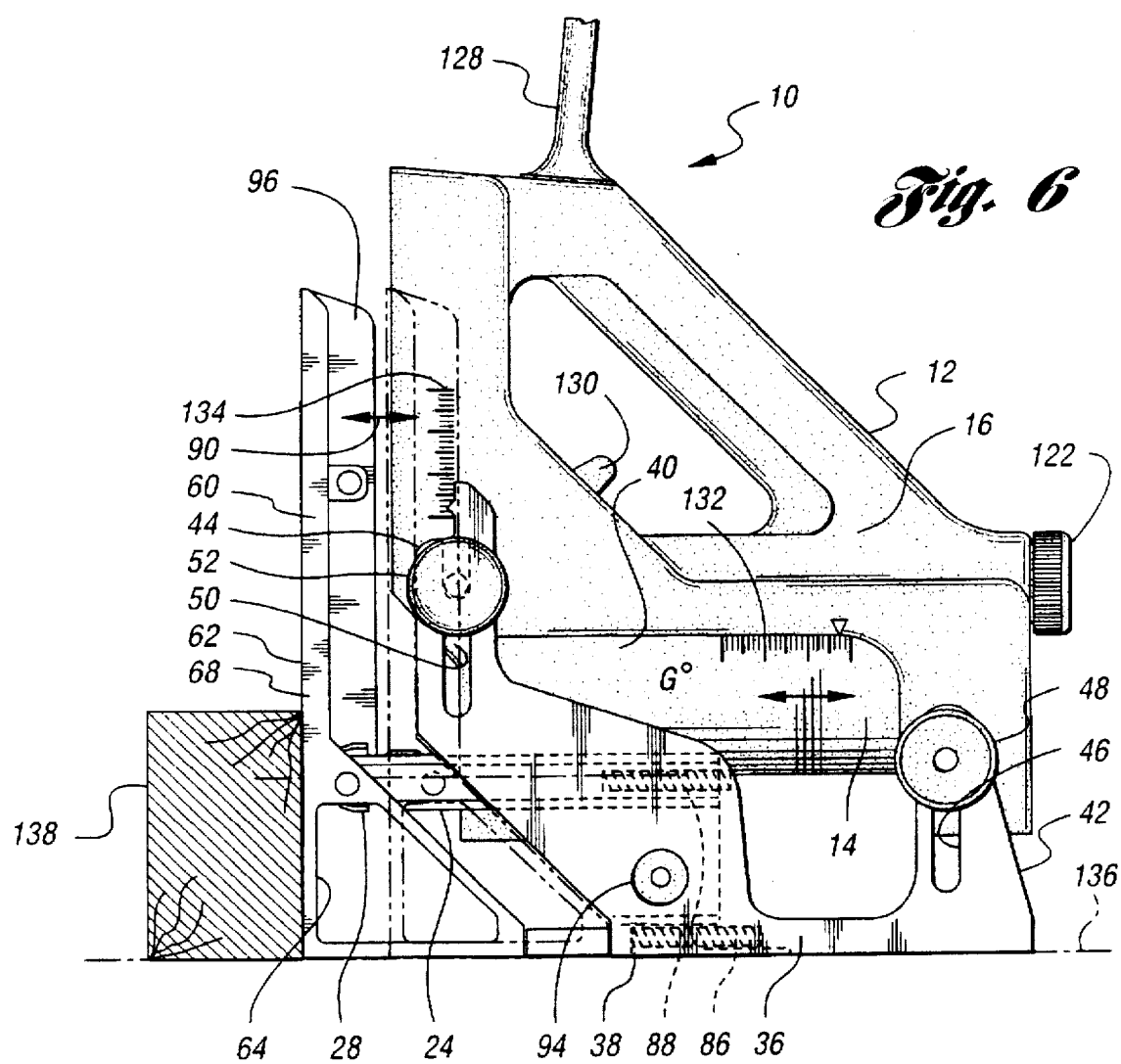
FIG. 6 is a side view showing one way that a workpiece may be cut using a router of the present invention.

Referring to FIG. 6, the router 10 is shown using the second fence 60 as a base when engaging a workpiece. First fence 36 is adjusted so that router bit 28 is at the desired height above surface 136. The second fence 60 is then placed flush against workpiece 138, and the router 10 is plunged into the workpiece 138. The depth of the slot is determined by the position of motor 18, as indicated by indicia 132.

It is to be appreciated that both the first planer surface 38 and the second planer surface 62 are sufficiently sized so that the router center of gravity, indicated at G (FIGS. 3 and 6), is located such that either the first planer surface 38 or the second planer surface 62 can serve as a base for the router 10. When the first planer surface 38 is used as a base, the router center of gravity G is located directly above the first planer surface. When the second planer surface 38 is used as a base, the router center of gravity G is located directly above the second planer surface. This achieves a versatile router that can be used for a wide variety of horizontal and vertical cutting operations.

Figure 7:
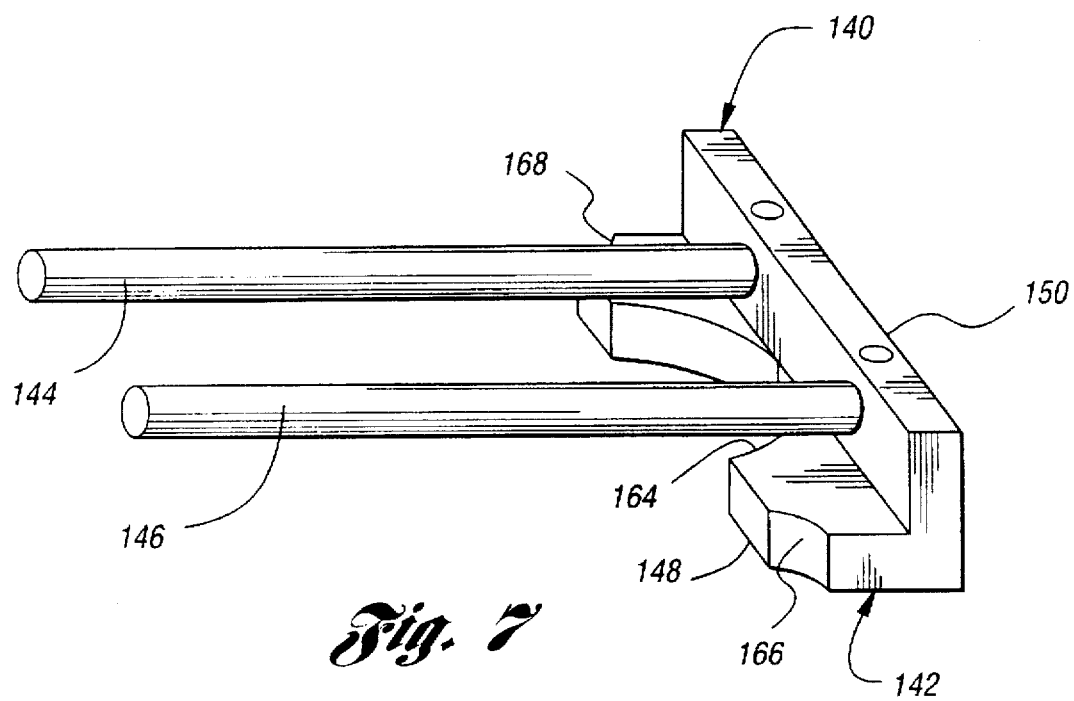
FIG. 7 is a perspective view showing an edge guide attachment for use with the router of the present invention.

FIG. 7 illustrates an edge guide 140 suitable for use with the router 10. Edge guide 140 is made up of a guide member 142 which is generally illustrated in axial end view, and a pair of guide rods 144 and 146. Guide 142 is made up of a first section 148 spaced from and extending generally parallel to guide rods 144 and 146, and a second section 150 affixed to and generally perpendicular to guide rods 144 and 146. Guide rods 144 and 146 are sized to be received within apertures in second fence 60. In the preferred embodiment illustrated, two pairs of apertures are formed in second fence 60. Guide rods 144 and 146 extend through apertures 152 and 154 (FIG. 1) when the edge guide 140 is oriented on a side of router 10, as illustrated in FIG. 8.

Figure 8:
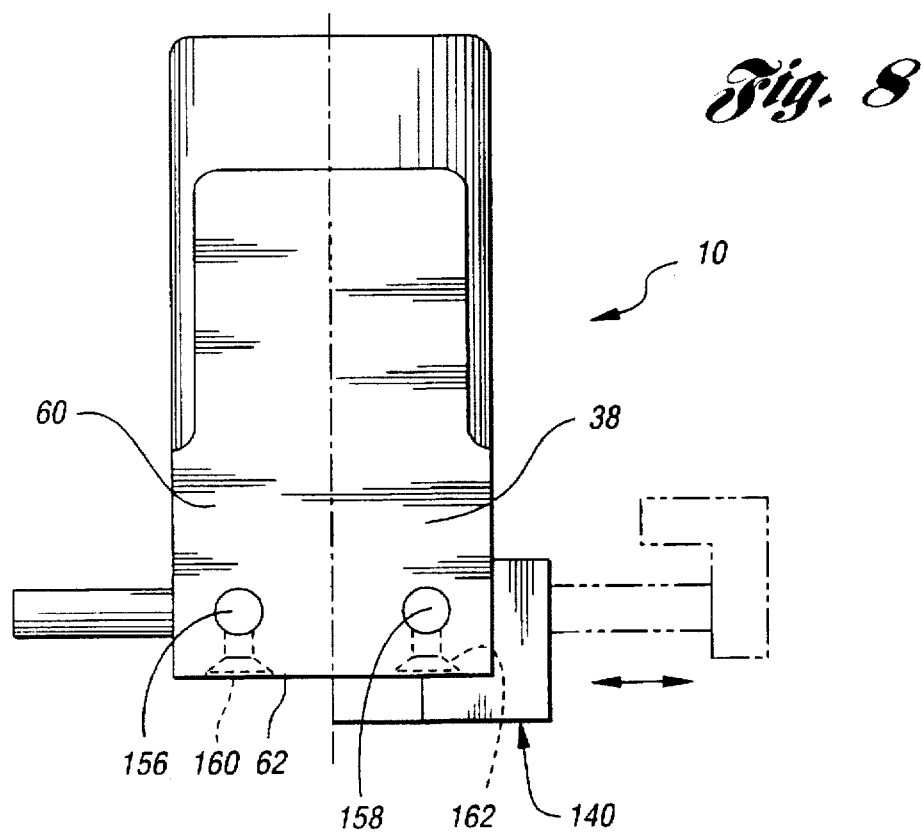
FIG. 8 is a front end view showing the edge guide mounted adjacent the left side of the router of an alternative attachment location shown in phantom outline.

It should be appreciated that the edge guide 140 can be mounted on either the right or the left side of the router 10 and the edge guide 140 can be oriented with the first section 148 below second planar surface 62, as illustrated in FIG. 8 (solid outline) or above the second planar surface 62, as illustrated in phantom outline in FIG. 8.

A second pair of apertures 156 and 158 project into the second fence 60 generally perpendicular to first planar surface 38, thereby enabling the user to alternatively position edge guide 140 relative to the first planar surface 38.

Each of the apertures is provided with a lock screw 160 and 162 enabling guide 144 to be positioned relative to the router at various positions along the axial length of guide rods 144 and 146. Screws 160 and 162 are recessed relative to second planar surface 62 sufficiently to prevent the screws 160 and 162 from scratching a work surface. First section 148 is provided with a central arcuate recess 164 and a pair of corner cut-outs 166 and 168, thereby enabling the guide first section 148 to be positioned close to the cutter center line without interfering with the cutter.

While the best mode for carrying out the invention has been described in detail, those familiar with the art to which this invention relates will recognize various alternative designs and embodiments for practicing the invention as defined by the following claims.

What is claimed is:

1. A router for engaging a workpiece to be cut, the router comprising:

a housing;

a motor disposed in the housing, the motor operatively rotating a drive shaft about a drive shaft axis;

a collet affixed to the drive shaft for receiving and supporting a bit for cutting the workpiece;

a first fence adjustably secured to the housing, the first fence having a first planer surface oriented substantially parallel to the drive shaft axis, the first fence being adjustable to move the first planer surface toward and away from the drive shaft axis to selectively space the bit from the first planer surface, the first planer surface being sufficiently sized so that router center of gravity is located directly above the first planer surface when the first planer surface is used as a base for the router; and a second fence slidably attached to the first fence, the second fence having a second planer surface oriented substantially perpendicular to the drive shaft axis, the second planer surface having an opening for receiving the bit therethrough, the second fence being slidable to move the second planer surface toward and away from the drive shaft to allow the bit to be plunged through the opening to cut the workpiece, the second planer surface being sufficiently sized so that router center of gravity is located directly above the second planer surface when the second planer surface is used as a base for the router.

2. The router of claim 1 further comprising:

a plunge depth adjustment mechanism cooperating with the drive shaft to selectively position the bit relative to the housing along the drive shaft axis to provide a plurality of plunge depths for the bit when the bit is plunged through the opening in the second planer surface.

3. The router of claim 2 wherein the housing comprises:

an outer housing having the first fence adjustably secured thereto; and an inner housing adjustably secured within the outer housing and having the motor and drive shaft disposed therein, wherein the plunge depth mechanism allows selective positioning of the inner housing relative to the outer housing to position the bit relative to the outer housing.

4. The router of claim 3 wherein the housing has a first set of indicia indicative of inner housing position relative to the outer housing, and a second set of indicia indicative of first fence position relative to the outer housing.

5. The router of claim 1 wherein the drive shaft is offset from the motor toward the first fence, the router further comprising:

a drive mechanism connecting the drive shaft to the motor to rotate the drive shaft.

6. The router of claim 1 wherein the drive shaft has a no load speed less than 20,000 rpm.

7. The router of claim 6 further comprising:

a motor speed selector mechanism connected in circuit with the motor to selectively operate the motor at high and low speeds.

8. A router for engaging a workpiece to be cut, the router comprising:

a housing;

a motor disposed in the housing, the motor operatively rotating a drive shaft about a drive shaft axis;

a collet affixed to the drive shaft for receiving and supporting a bit for cutting the workpiece;

a first fence adjustably secured to the housing, the first fence having a first planer surface oriented substantially parallel to the drive shaft axis, the first fence being adjustable to move the first planer surface toward and away from the drive shaft axis to selectively space the bit from the first planer surface;

a second fence slidably attached to the first fence, the second fence having a second planer surface oriented substantially perpendicular to the drive shaft axis, the second planer surface having an opening for receiving the bit therethrough, the second fence being slidable to move the second planer surface toward and away from the drive shaft to allow the bit to be plunged through the opening to cut the workpiece; and a plunge depth adjustment mechanism cooperating with the drive shaft to selectively position the bit relative to the housing along the drive shaft axis to provide a plurality of plunge depths for the bit when the bit is plunged through the opening in the second planer surface.

9. The router of claim 8 wherein the housing comprises:

an outer housing having the first fence adjustably secured thereto; and an inner housing adjustably secured within the outer housing and having the motor and drive shaft disposed therein, wherein the plunge depth mechanism allows selective positioning of the inner housing relative to the outer housing to position the bit relative to the outer housing.

10. The router of claim 9 wherein the housing has a first set of indicia indicative of inner housing position relative to the outer housing, and a second set of indicia indicative of first fence position relative to the outer housing.

11. The router of claim 8 wherein the drive shaft is offset from the motor toward the first fence, the router further comprising:

a drive mechanism connecting the drive shaft to the motor to rotate the drive shaft.

12. The router of claim 8 wherein the drive shaft has a no load speed less than 20,000 rpm.

13. The router of claim 12 further comprising:

a motor speed selector mechanism connected in circuit with the motor to selectively operate the motor at high and low speeds.

14. A fence assembly for a router, the router having a housing with a motor disposed therein, the motor operatively rotating a drive shaft about a drive shaft axis, and a collet being affixed to the drive shaft for receiving and supporting a bit for cutting a workpiece, the fence assembly comprising:

a first fence adjustably secured to the housing, the first fence having a first planer surface oriented substantially parallel to the drive shaft axis, the first fence being adjustable to move the first planer surface toward and away from the drive shaft axis to selectively space the bit from the first planer surface, the first planer surface being sufficiently sized so that router center of gravity is located directly above the first planer surface when the first planer surface is used as a base for the router; and a second fence slidably attached to the first fence, the second fence having a second planer surface oriented substantially perpendicular to the drive shaft axis, and having an opening for receiving the bit therethrough, the second fence being slidable to move the second planer surface toward and away from the drive shaft to allow the bit to be plunged through the opening to cut the workpiece, the second planer surface being sufficiently sized so that router center of gravity is located directly above the second planer surface when the second planer surface is used as a base for the router.

* * * * *